US005735612A

United States Patent [19]
Fox et al.

[11] Patent Number: 5,735,612
[45] Date of Patent: Apr. 7, 1998

[54] SINGLE ROW TAPERED ROLLER BEARING

[75] Inventors: Gerald P. Fox, Massillon, Ohio; John R. Dieterle, Rochester, Hills, Mich.

[73] Assignee: The Timken Company, Canton, Ohio

[21] Appl. No.: 815,753

[22] Filed: Mar. 12, 1997

Related U.S. Application Data

[63] Continuation-in-part of Ser. No. 340,054, Nov. 15, 1994, abandoned.

[51] Int. Cl.[6] ................................................ F16C 33/58
[52] U.S. Cl. ................................. 384/448; 384/571
[58] Field of Search ........................ 384/448, 571, 384/446, 569, 565, 584

[56] References Cited

U.S. PATENT DOCUMENTS

| | | |
|---|---|---|
| 1,617,319 | 2/1927 | Buckwalter . |
| 1,787,712 | 1/1931 | Wooler . |
| 3,397,020 | 8/1968 | Edwards . |
| 3,420,589 | 1/1969 | Green et al. . |
| 3,716,788 | 2/1973 | Nishida . |
| 3,870,911 | 3/1975 | Toyama et al. . |
| 4,778,286 | 10/1988 | Kadokawa . |
| 5,085,519 | 2/1992 | Dougherty ........................ 384/448 |
| 5,129,742 | 7/1992 | Tilch et al. ........................ 384/448 |
| 5,308,171 | 5/1994 | Sakamoto . |
| 5,494,358 | 2/1996 | Dougherty ........................ 384/448 |
| 5,527,114 | 6/1996 | Morita ........................ 384/448 |

*Primary Examiner*—Lenard A. Footland
*Attorney, Agent, or Firm*—Polster, Lieder, Woodruff & Lucchesi, L.C.

[57] ABSTRACT

A bearing for enabling an axle shaft to rotate in a housing includes a cup which is attached to the housing, a cone which fits over the axle shaft, and tapered rollers arranged in a single row between tapered raceways on the cup and cone. The cup has a thrust rib at the large diameter end of its raceway, while another thrust rib is located at the small diameter end of the cone raceway. The arrangement is such that the bearing transmits radial loads and thrust loads in both directions. In one direction the thrust loads are taken on the raceways; in the other through the ribs. The cup contains an oblique bore which opens toward the axis of rotation beyond the small diameter end of the cup raceway, and this bore contains a speed sensor. An excitor ring rotates with the cone immediately inwardly from the speed sensor, and it has disruptions which cause the sensor to produce a pulsating signal, the frequency of which reflects the angular velocity. The excitor ring may be part of a rib ring that fits over the axle shaft and against the end of the cone, or it may be on a locking collar that fits over the axle shaft and against the end of the cone. The cone may be an integral part of the axle shaft with its raceway being a surface on the axle shaft.

23 Claims, 5 Drawing Sheets

SINGLE ROW TAPERED ROLLER BEARING

CROSS-REFERENCE TO RELATED APPLICATIONS

This application is a continuation-in-part of the application Ser. No. 08/340,054 of Gerald P. Fox, filed Nov. 15, 1994, and entitled Single Row Tapered Roller Bearing, abandoned.

BACKGROUND OF THE INVENTION

This invention relates in general to tapered roller bearings and more particularly to a single row tapered roller bearing equipped with a speed sensor and having the capacity to take thrust loads in both axial directions.

Many rear wheel drive vehicles, typically large passenger cars, sport-utility vehicles and light trucks, are equipped with semi-floating rear axle shafts which rotate in solid axle housings. In the typical arrangement a single housing contains a differential and two axle shafts which extend through the housing from the differential, emerging from the housing at its ends. Here the axle shafts are fitted with drive flanges to which brake drums or disks and the road wheels are fastened. At each of its ends the housing contains an antifriction bearing, and the two axle shafts extend through and rotate within these bearings. In other words, the bearings support the semi-floating axle shafts in the housing.

Several types of axle bearings exist for semi-floating axle shafts. Perhaps the most common is a simple cylindrical roller bearing. This bearing has a race which fits into the end of the axle housing and presents a raceway inwardly toward the axis of rotation and ribs at each end of the raceway. Cylindrical rollers move along the raceway and are confined axially by the ribs. The other raceway exists on the surface of the axle shaft. These bearings, by reason of the cylindrical configuration of their rollers, have radial play on the order of 0.005 inches. Moreover, they do not resist axial or lateral play in the semi-floating axle shaft, and that play can be as much as 0.030 inches.

Of course, the wheel and brake drum or disk attached to the axle likewise experience the large lateral play, moving back and forth as much as 0.030 inches during the operation of the vehicle. Drum brakes tolerate this lateral play, inasmuch as they have cylindrical braking surfaces. But disk brakes, owing to their radial braking surfaces, experience poor performance and excessive wear by reason of lateral play of that magnitude. The tendency of axle shafts to deflect under heavy loads contributes to the problem. Yet, from the standpoint of braking, disk brakes are considerably more effective than drum brakes.

Practically all medium and large trucks use full floating axles. Like semi-floating axle shafts, full floating axle shafts typically extend through housings, but the housings do not contain any bearings for supporting the shafts—at least directly within the housing. Instead, the typical housing at its ends supports hubs which rotate on bearings fitted around the housing. The full floating axle shafts emerge from the ends of the housing where they are fitted with drive flanges which are in turn coupled to the hubs. Each hub typically rotates on two single row tapered roller bearings organized in opposition so that the bearings accommodate both inwardly and outwardly directed thrust loads. Furthermore, the arrangement enables the bearings to be adjusted against each other to optimize radial and end play. But for smaller vehicles, full floating axles with their multiple bearings represent an expensive solution—certainly more expensive than semi-floating axle shafts mounted on single row bearings. Thus, semi-floating axle shafts supported on single row bearings find widespread use in lighter automotive vehicles.

While the traditional single row tapered roller bearing takes thrust loads only in one direction—the direction that seats the rollers along the tapered raceways—a modified single row tapered roller has the capacity to take thrust loads in both axial directions—and this bearing has seen use with semi-floating rear axle shafts for passenger cars and light trucks. The basic bearing, which forms the subject of U.S. Pat. Nos. 3,397,020 and 3,420,589, accommodates heavy thrust loads through its raceways and lighter thrust loads in the opposite direction through thrust ribs located at the ends of its rollers. As such, the bearing is quite suited for use in semi-floating axle shafts of rear wheel drive vehicles, for the wheel on the outside of a turn experiences greater thrust than the wheel on the inside of the turn. Thus, the bearing is oriented such that the heavier outboard thrust loads caused by negotiating a turn are supported through the raceways and the lighter inboard thrust loads are supported through the thrust ribs. But a tapered roller bearing of this type has traditionally required use of a stamped metal flange to hold it in place and has demanded a measure of skill and judgment for installing the flange.

Automobile manufacturers now offer antilock braking systems and traction control systems. An antilock braking system monitors the angular velocity of the wheels and adjusts the braking force at the individual wheels to insure that all of the wheels remain rotating and do not skid. These systems operate most efficiently when all four wheels are monitored, but frequently only the two front wheels and the rear drive shaft are monitored, creating a so-called "three channel" system. On the other hand, traction control requires monitoring the angular velocity of all of the drive wheels.

Speed sensors for monitoring the angular velocity of the wheels on a vehicle add to the cost of manufacturing the vehicle and further represent additional components at wheel locations where space is at a premium. The more common sensors for rear axles are mounted externally to monitor rotating excitor rings which are exposed. Others are mounted internally. The latter consume less space at the wheel ends and are not subjected to road debris and moisture, but require modification of the axle housings.

BRIEF SUMMARY OF THE INVENTION

The present invention resides in a single row tapered roller bearing having the capacity to accommodate thrust loads in both axial directions. The bearing attaches quickly and reliably to the end of an axle housing for supporting an axle shaft in the housing, and the installation requires minimum skill. The bearing contains a speed sensor which produces a pulsating electrical signal, the frequency of which reflects the angular velocity of the axle. The invention also resides in a single row tapered roller bearing which likewise has the capacity to accommodate thrust loads in both axial directions, and further has a mounting flange on its outer race for securing the bearing to an axle housing. The invention also consists in the parts and in the arrangements and combinations of parts hereinafter described and claimed.

BRIEF DESCRIPTION OF THE SEVERAL VIEWS OF THE DRAWINGS

In the accompanying drawings which form part of the specification and wherein like numerals and letters refer to like parts wherever they occur.

DETAILED DESCRIPTION OF THE INVENTION

Figure 1:
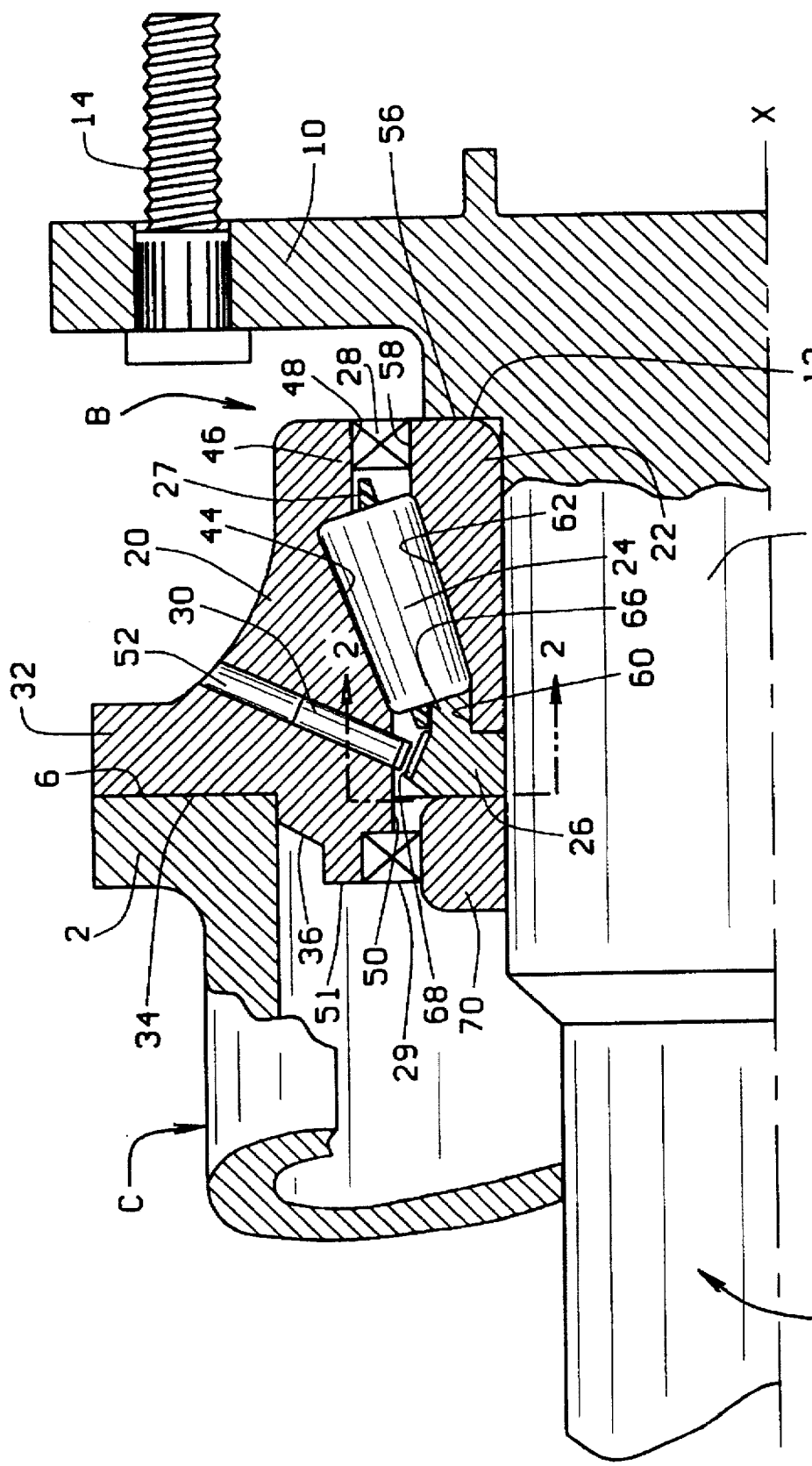
FIG. 1 is a longitudinal half sectional view of an axle bearing constructed in accordance with and embodying the present invention, the bearing being depicted supporting an axle within an axle housing.

Referring now to the drawings, a semi-floating axle shaft A (FIG. 1) extends through a bearing B which enables the axle shaft A to rotate within a housing C. The bearing B not only confines the axle shaft A radially within the housing C, but also positions it axially, preventing it from being displaced in either axial direction, all while enabling the axle shaft A to rotate about an axis X with minimum friction. In other words, the bearing B transmits radial loads from the housing C to the axle shaft A and axial loads in both directions as well. Apart from that, the bearing B serves to monitor the angular velocity of the axle shaft A, providing a pulsating signal, the frequency of which reflects the angular velocity. Typically the housing C extends transversely beneath the rear of an automotive vehicle and is attached to the rear springs of the vehicle. It is identical at both of its ends. Indeed, an axle shaft A extends out of each end, and to each a rear road wheel is attached. Each axle shaft A transmits torque to its road wheel to propel the vehicle.

The housing C, which is tubular, terminates at a flange 2 having an end face 6 that is generally squared off with respect to the axis X. The flange 2 contains threaded holes 4 (FIG. 3) which open out of the end face 6.

The axle shaft A extends through the housing C, and for most of its length is of constant diameter (FIG. 1). However, in the region of the flange 2, the axle shaft A has an enlarged cylindrical seat 8 which projects axially beyond the flange 2 and merges into a drive flange 10 at a shoulder 12. The drive flange 10 projects radially beyond the flange 2 of the housing C and is provided with threaded studs 14 for securing a road wheel to the axle shaft A and a brake disk or drum as well.

The bearing B fits against the flange 2 of the housing C and around the seat 8 of the axle shaft A, and it enables the axle shaft A to rotate in the housing C, all while confining the axle shaft B both radially and axially with respect to the housing C (FIG. 1). By occupying and closing the annular space between the axle shaft A and housing C, the bearing B prevents contaminants from entering that space. Basically, the bearing B includes an outer race or cup 20, an inner race or cone 22, tapered rollers 24 located between the cup 20 and cone 22, a rib ring 26 at one end of the cone 22, and a cage 27 for maintaining the proper spacing between the rollers 24. In addition, the bearing B has an outboard seal 28 which closes the annular space between the cup 20 and the cone 22 at the outboard end of the bearing B and an inboard seal 29 which isolates the interior of the bearing B from the interior of the housing C. Finally the bearing B includes a speed sensor 30 which produces an electrical signal, the frequency of which reflects the angular velocity of the axle shaft A.

Considering the cup 20, it is machined from high quality bearing steel. It projects axially beyond the housing C and at its outboard end is generally cylindrical on its exterior surface, but a flange 32 emerges from that surface and enlarges the inboard end of the cup 20 (FIG. 1). The flange 32, which is an integral part of the cup 20, at its one end has a back face 34 that is generally squared off with respect to the axis X. The back face 34 fits against the end face 6 of the flange 2 on the housing C. The other face of the flange 32 takes the form of a fillet that is presented toward the drive flange 10 on the axle shaft A. The cup 20 projects beyond the back face 34 of the flange 32 in the form of a pilot or nose portion 36 which extends into the housing C and serves to locate the cup 20 radially on the housing C. The flange 32 contains bolt holes 38 (FIG. 3) which align with the threaded holes 4 in the flange 2 of the housing C. The flange 32 also contains sockets 40 which open out of the fillet at the front of the flange 2 and lead up to the holes 38. The sockets 40 receive the heads of bolts 42 which pass through the holes 38 and engage the threads of the threaded holes 4 in the flange 2 on the housing C. The bolts 42 are tightened to secure the cup 20 firmly on the end of the housing C.

The cup 20 also has a tapered raceway 44 which faces inwardly toward the axis X, its small end being presented toward the interior of the housing C and its large end toward seal 28 (FIG. 1). Indeed, the large end of the raceway 44 lies along a thrust rib 46 which projects radially inwardly beyond that end of the raceway 44 as an integral part of the cup 20. The rib 46 has an extended cylindrical surface 48 which leads out to the outboard end of the cup 20 and receives the seal 28. The small end of the tapered raceway 14 merges into another extended cylindrical surface 50 which leads out to a counterbore 51 at the opposite or inboard end of the cup 20. The surface 50 encircles the rib ring 26 at the inboard end of the cone 22, whereas the counterbore 51 lies beyond the rib ring 26 and opens out of the inboard end of the cup 20. The counterbore 51 receives the inboard seal 29 which isolates the interior of the bearing B from the interior of the housing C. Actually, the inboard seal 29 and the counterbore 51 in which it fits are optional, being used only where grease is the lubricating medium for the bearing. As such, the seal 29 prevents oil that migrates through the housing C from diluting the grease.

Finally the cup 20 contains a bore 52 which leads inwardly from the fillet of the flange 32, oblique to the axis X, and opens out of the cylindrical surface 50 (FIG. 1). Thus, the inner end of the bore 52 is positioned toward the rib ring 26. The speed sensor 30 fits within the bore 52 with its inner end presented toward rib ring 26.

The cone 22, which is likewise formed from high quality bearing steel, fits snugly over the cylindrical seat 8 on the axle A, its bore being slightly smaller in diameter than the seat 8, so that an interference fit exists between the seat 8 and the cone 22 (FIG. 1). Each end of the cone 22 is squared off with respect to the axis X, and the outboard end, that is the end presented away from the interior of the housing C, forms a back face 56 which bears against the shoulder 12 on the drive flange 10 for the axle A. The outwardly presented surface of the cone 22 consists of a cylindrical surface 58 that runs out to the back face 56, another yet smaller, cylindrical surface 60 that runs out to the other end face, and a tapered raceway 62 that lies between, and at its ends merges with, the cylindrical surfaces 58 and 60. The larger cylindrical surface 58 lies within the thrust rib 46 of the cup 20 and cooperates with the seal 28 to establish a dynamic fluid barrier between the cup 20 and cone 22. The smaller cylindrical surface 60 lies within the cylindrical surface 50 at the opposite end of the cup 20, but in length is considerably shorter than that surface. The tapered raceway 62 of the cone 22 is presented toward the tapered raceway 44 of the cup 20. Indeed, the two tapered raceways 44 and 62, if extended to their respective apices, will have those apices located at essentially the same point along the axis X of the bearing B.

The raceway 62 of the cone 22 lies concentric to the raceway 44 of the cup 20, there being an annular space between the two, and that space is occupied by the rollers 24 (FIG. 1). Generally speaking, line contact exists between the side faces of the rollers 24 and the tapered raceways 44 and 62. Since the raceways 44 and 62 have their apices at a common point along the axis X, the rollers 24 are on apex, and as a consequence essentially pure rolling contact occurs between the side faces of the rollers 24 and raceways 44 and 62 as the cone 22 rotates within the cup 20 and the rollers 24 roll along the raceways 44 and 62. The large end faces of the rollers 24 bear against the thrust rib 46 on the cup 20, and indeed the thrust rib 46 prevents the rollers 24 from being expelled from the space between the two raceways 44 and 62. In this regard, a radial load transmitted through a roller 24 translates into a small axially directed component, owing to the tapered geometry, and that component would expel the rollers 24 were it not for the thrust rib 46. The cage 27 separates the rollers 24 and maintains the proper spacing between them.

Figure 2:
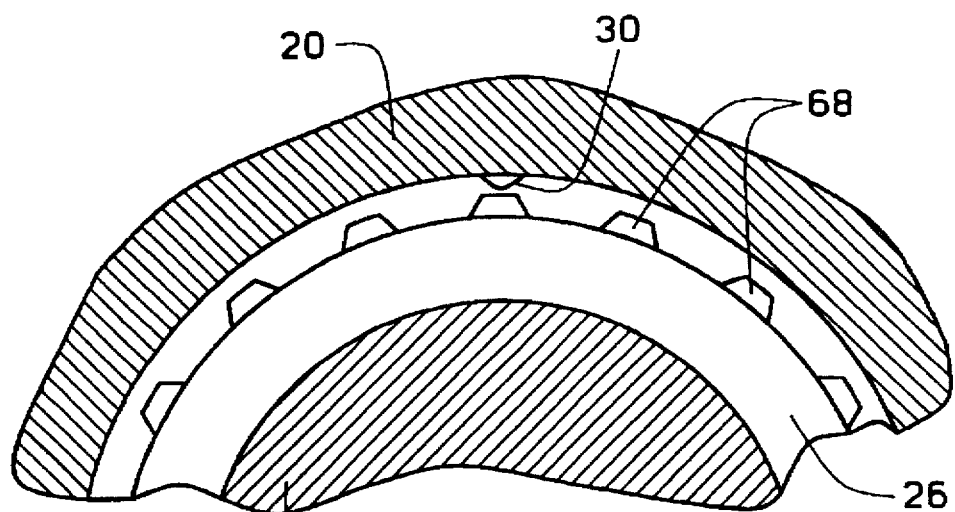
FIG. 2 is a fragmentary sectional view taken along line 2—2 of FIG. 1.

The rib ring 26 fits over the bearing seat 8 and against that end face of the cone 22 which is presented toward the interior of the housing C (FIG. 1). It includes an axially directed thrust rib 66 which extends over the smaller cylindrical surface 60 of the cone 22 where it is presented opposite the small ends of the rollers 24. When the large ends of the rollers 24 are against the thrust rib 46 of the cup 20, as they normally are during the operation of the bearing B, only a small clearance on the order of 0.001 to 0.003 inches exists between the small end faces of the rollers 24 and the rib 66 of the rib ring 26. Thus, the bearing B has very little internal clearance, radial or axial. The rib ring 26 lies within the cylindrical surface 50 at the end of the cup 20, and on its outer surface has teeth 68 which are arranged at equal circumferential intervals and are beveled to lie perpendicular to the axis of the sensor 50 when presented opposite the sensor 30 (FIG. 2). The teeth 68, which are formed integral with the rib ring 26—and in effect create disruptions on it—form a tone or excitor ring on the outwardly presented surface of the rib ring 26. They are presented immediately inwardly from the sensor 30, so when the cone 22 rotates with the axle shaft A, the teeth 68 on the rib ring 26 describe a cone which lies quite close to the inner end of the sensor 30, there being an average air gap of about 0.010 to 0.012 inches between the cone so described and the sensor 30. As the teeth 68 pass by the sensor 30 they disrupt a magnetic field produced by the sensor 30, and the sensor 30 detects the disruptions, producing a pulsating signal.

The cone 22 and rib ring 26 are held firmly in place on the cylindrical seat 8 of the axle shaft A by a locking collar 70 which is forced over the cylindrical seat 8. A heavy interference fit exists between locking collar 70 and the seat 8—indeed, heavy enough to render the collar 70 incapable of being dislodged by working loads. Thus, the cone 22 and rib ring 26 are captured snugly between the drive flange 10 and the locking collar 70. Moreover, the locking collar 70 cooperates with the seal 29 to establish a fluid barrier at the inboard end of the bearing B.

In operation, the axle A rotates within the housing C with radial loads being transferred from the housing C to the axle shaft A through the bearing B. As a consequence of the rotation and radial load, the rollers 24 roll along the raceways 44 and 62 with their large end faces against the thrust rib 46. Should the axle shaft A encounter a thrust load which urges the drive flange 10 toward the end of the housing C, the rollers 24 will transmit that load through the raceways 44 and 62, the loads in effect passing normally through the rollers 24 and seating the rollers 24 more firmly between the raceway 44 and 62. Thrust loads in the opposite direction, that is the direction which draws the drive flange 10 away from the end of the housing C, are likewise transmitted through the rollers 24, but instead of normally, these loads pass generally axially through the rollers 24 and are resisted at the two thrust ribs 46 and 66 between which the rollers 24 are captured. The bearing B should be mounted such that the lighter thrust loads are taken through the ribs 46 and 66 and the heavier through the raceways 44 and 62. The axle A experiences a slight amount of end play in transferring from one direction of thrust to the other, but it is small—indeed, essentially no more than the clearance between small thrust rib 66 and the small end faces of the rollers 24 when the rollers 24 are fully seated along the raceways 44 and 62. The rib ring 26 of course rotates with the cone 22, and as it does, the teeth 68 in its periphery disrupt a magnetic field produced by the sensor 30. The sensor 30 detects the disruptions and produces a pulsating electrical signal, the frequency of which reflects the angular velocity of the rib ring 26 and of course the axle shaft A as well. The outboard seal 28 retains the lubricant for the bearing B within the interior of the bearing B and further excludes contaminants from that interior. The inboard seal 29 prevents oil in the housing C from mixing with the bearing lubricant, when it is grease, but the seal 29 may be eliminated when the oil in housing C is used as the lubricant for the bearing B.

Figure 3:
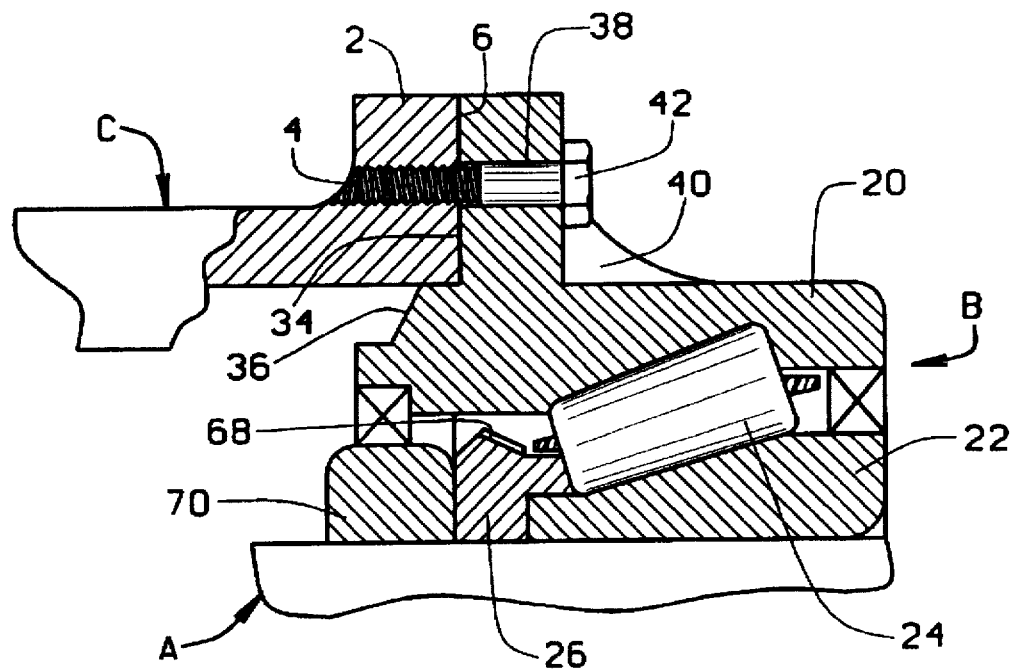
FIG. 3 is a fragmentary sectional view similar to FIG. 1, but rotated slightly to show a bolt that attaches the bearing to the housing.
Figure 4:
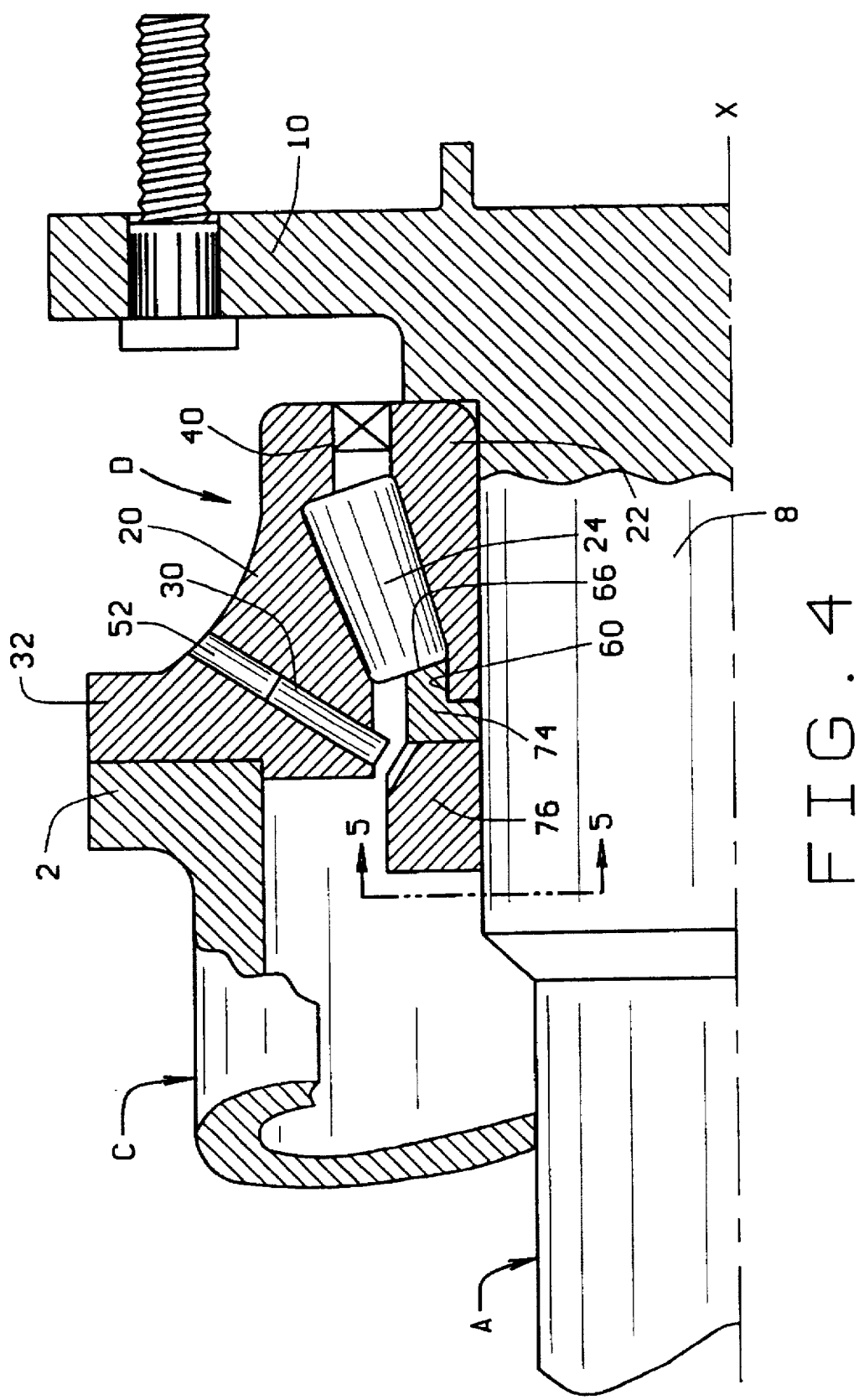
FIG. 4 is a half sectional view of a modified bearing.
Figure 5:
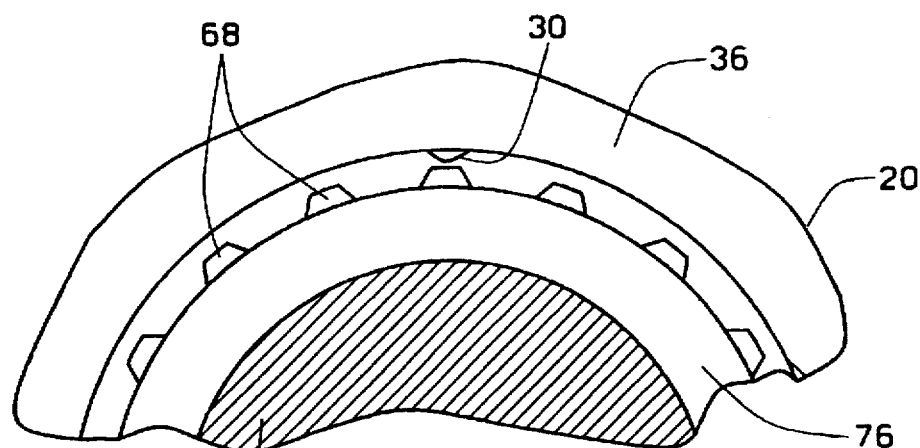
FIG. 5 is a fragmentary sectional view taken along line 5—5 of FIG. 4.

A modified bearing D (FIGS. 4 & 5) is very similar to the bearing B, but has a slightly different rib ring 74. The difference resides in the absence of teeth on the ring 74; it does not function as an excitor ring. However, the rib ring 74 does have the thrust rib 66 embodied in it, and the rib 66 is ground such that the end play within the bearing ranges between 0.001 and 0.003 inches. The rib ring 74 is secured against the end of the cone 22 with a locking collar 76 which fits over the seat 8 with a heavy interference fit. In contrast to the collar 70 for the bearing B, the collar 76 for the bearing D has teeth 68 which are beveled so as to be presented perpendicular to the axis of the bore 52 in which the sensor 30 is located. The teeth 68 form a tone or excitor ring on the locking collar 76 (FIG. 3). The oblique bore 52 opens toward the teeth 68 on the locking collar 76, thus presenting the end of the sensor 30 close to the cone described by the teeth 68 when the locking collar 76 rotates with the axle shaft A.

The teeth 68 on the rotating locking collar 76 disrupt the magnetic field produced by the sensor 30, and the sensor 30 detects the disruptions, producing a pulsating signal.

Figure 6:
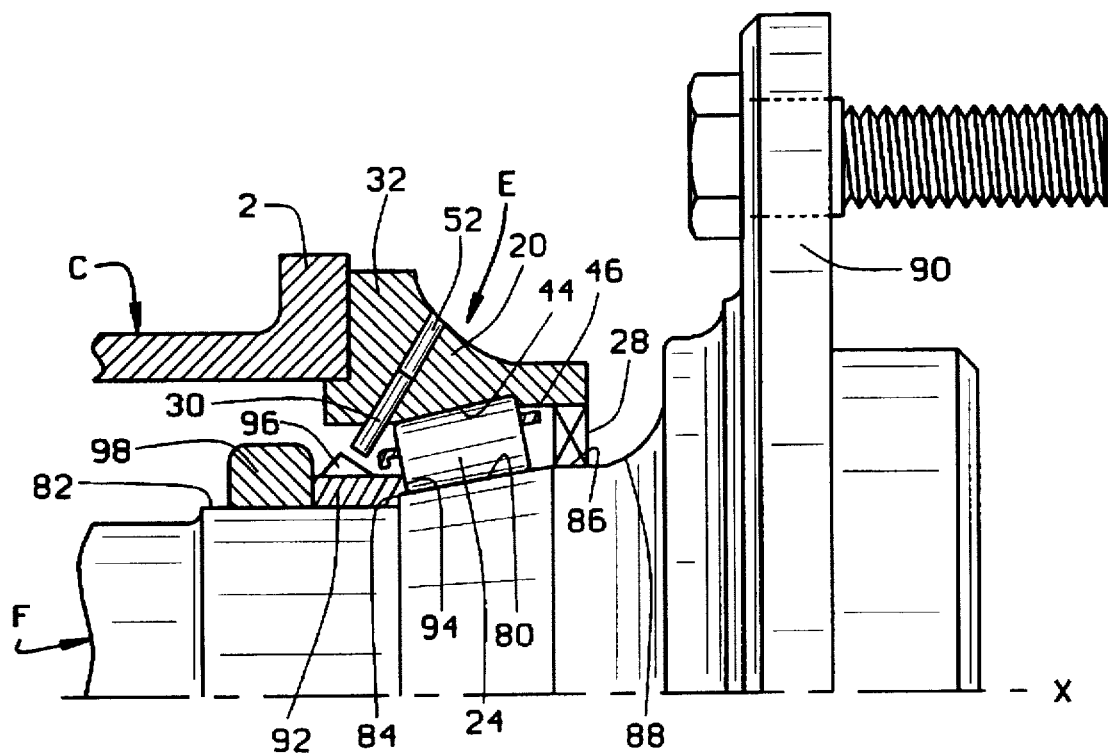
FIG. 6 is a half sectional view of another modified bearing.

Another modified bearing E (FIG. 6.) serves to support a modified shaft F in the housing C, enabling the shaft F to rotate in the housing C, but confining it both radially and axially. The modified bearing E resembles the bearing B in that it has a cup 20 and tapered rollers 24 which are in essence the same as their counterparts in the bearing B. Thus, the cup 20 for the bearing E has a flange 32 which is secured against the flange 2 at the end of the housing C with bolts 42. Moreover, the cup 20 has an oblique bore 52 that contains a speed sensor 30.

The tapered rollers 24 roll along the tapered raceway of the cup 20 with large ends of those rollers 24 against the thrust rib 46 that projects inwardly from the large end of the raceway 44. The rollers 24 also roll along another tapered raceway 80 which in configuration corresponds to the raceway 62 on the cone 22 of the bearing B. However the raceway 80 does not lie along a separate cone; instead, it forms part of the modified axle shaft F.

In this regard, the modified axle F has a slightly raised cylindrical seat 82 which lies generally at the inboard end of the cup 20. The seat 82 terminates at a shoulder 84 beyond which the raceway 80 lies. Indeed, the raceway 80 tapers downwardly to the shoulder 84. The raceway 80 at its opposite end merges with short cylindrical surface 86 along which the outboard seal 28 establishes a fluid barrier. Beyond, the seal 28, the short cylindrical surface 86 merges into a fillet 88 which in turn merges into a drive flange 90 which corresponds to the drive flange 10 on the axle shaft A.

The bearing E also includes a rib ring 92 that fits over the raised cylindrical seat 82 on the axle F and against the shoulder 84 at the end of the seat 82, there being an interference fit between the seat 82 and the ring 92. The rib ring 92 has a rib 94 which projects beyond the shoulder 84 and lies along the raceway 80, terminating at a face that is presented toward the small diameter ends of the rollers 24. Indeed, the rollers 24 lie captured between the rib 46 at the large end of the cup raceway 44 and the rib 94 at the small end of the axle raceway 80 with little axial clearance, and this capture serves to confine the axle shaft F axially in the housing C. The rib ring 92 also has teeth 96 which are presented outwardly and at a bevel so that they are oriented perpendicular to the axis of the bore 52 in the cup 20 when they pass by the end of the bore 52 and the sensor 30 which is in it. In effect, the circular row of teeth 96 form on the rib ring 92 an excitor ring that has the capacity to induce a pulsating signal in the sensor 30.

The axle shaft F beyond the rib ring 92 carries a locking collar 98 which fits around the seat 82 with an interference fit even greater than the one with which rib ring 92 is installed. The locking collar 98 ensures that the rib ring 92 remains in place and thus preserves the integrity of the bearing E.

Actually, in the bearing E the cone for the bearing E is integrated into the axle shaft F, but otherwise it is essentially the same as the bearing B. To resist wear and indentations along its tapered raceway 80, the axle shaft F should be hardened in that region.

Figure 7:
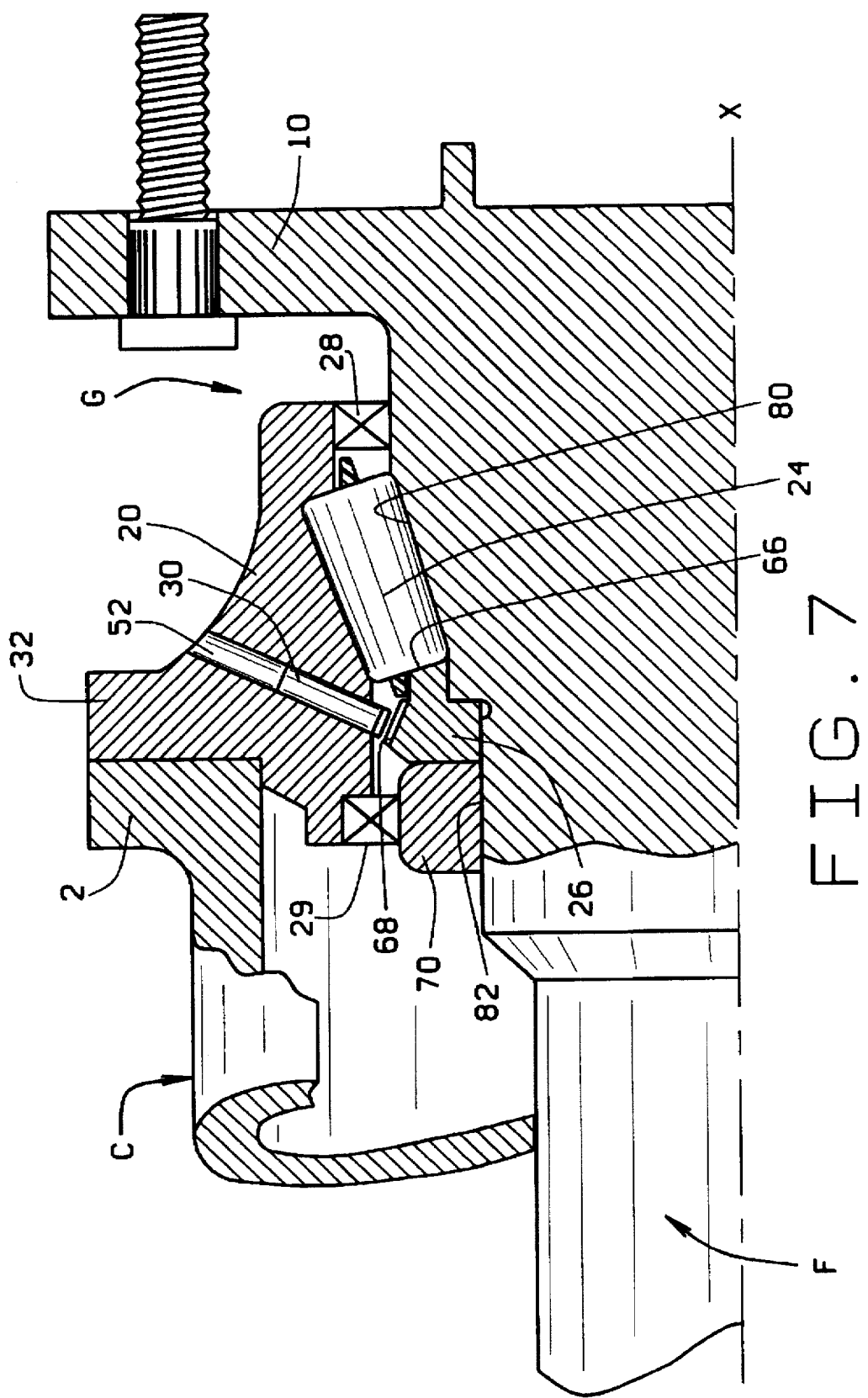
FIG. 7 is a half sectional view of still another modified bearing.

Still another modified bearing G (FIG. 7) is quite similar to the bearing E and also the bearing B. Like the bearing E, the bearing G has an axle shaft F provided with a tapered raceway 80 formed directly on the shaft F as well as a raised cylindrical seat 82 at the small end of the raceway 80. Like the bearing B, the bearing G has a seal 29 fitted to the inboard end of its cup 20 and that seal 29 establishes a dynamic fluid barrier along the outer surface of a locking collar 70 that is pressed over the seat 82. The collar 70 fits against a rib ring 26 on which a thrust rib 66 is formed. The seal 29 prevents oil that is within the axle housing C from entering the interior of the bearing G where the tapered rollers 24 orbit the raceway 80. As a consequence, grease may be used as the lubricant for the rollers 24 and the critical surfaces along which they move.

The cup 20 for the bearing G contains a bore 52 which receives a speed sensor 30. The rib ring 26 has teeth 68 which are presented toward the end of the sensor 30 and induce a pulsating signal in the sensor 30.

The variations on the rib ring 26 for the bearing B, on the locking collar 76 for the bearings D and G, and on the rib ring 92 for the bearing E need not necessarily be teeth. They may assume other configurations or may even constitute alternating north and south magnetic poles arranged circumferentially around the ring 26 or collar 76 or the ring 92.

The axle shafts A and F, by reason of being cantilevered beyond their respective bearings B, D, E, G tend to deflect, creating a slight amount of misalignment between the axis X of rotation and the axis of the housing C. The misalignment brings the rollers 24 slightly off axis and they do not seat properly along the cup raceway 44 or the cone raceways 62 or 80. To accommodate this misalignment, the end face 6 on the flange 2 of the axle housing C may be machined slightly off square, that is such that the angle between it and a plane perpendicular to the true axis of the housing C corresponds to the amount of the misalignment under a selected load. This brings the axis of the shaft A or F into alignment with the bearing B, D, E or G within which the shaft is confined, in the region where the shaft A or F extends through its bearing B, D, E or G. But, of course, the axis of the cup raceway 44 is slightly misaligned with respect to the axis of the axle housing C.

In lieu of machining the end face 6 on the housing flange 6 slightly off square to accommodate misalignment caused by deflection of the axle shafts A or F, the back face 34 on the flange 32 of the cup 20 may be machined off square.

This invention is intended to cover all changes and modifications of the example of the invention herein chosen for purposes of the disclosure which do not constitute departures from the spirit and scope of the invention.

As various changes could be made in the above constructions without departing from the scope of the invention, it is intended that all matter contained in the above description or shown in the accompanying drawings shall be interpreted as illustrative and not in a limiting sense.

We claim:

1. A bearing for facilitating rotation about an axis, said bearing comprising: a cup having a raceway that is presented inwardly toward the axis, the raceway being tapered so that it has a large diameter end and a small diameter end; a cone having a raceway that is presented outwardly toward the cup raceway, the cone raceway likewise being tapered so that it has large and small diameter ends, with the large diameter end being at the large diameter end of the cup raceway and the small diameter end being at the small diameter end of the cup raceway; a first thrust rib mounted in a fixed position with respect to the cup and located beyond the large diameter end of the cup raceway; a second thrust rib mounted in a fixed position with respect to the cone and located at the small diameter end of the cone raceway; tapered rollers arranged in a single row between the raceways of the cup and cone and contacting those raceways along their tapered side faces, the rollers having their large end faces located along the first thrust rib and their small end faces located along the second thrust rib; a speed sensor carried by the cup and presented inwardly toward the axis beyond the small diameter end of the cup raceway; and an excitor ring mounted in a fixed position with respect to the cone beyond the small diameter end of the cone raceway and presented toward the speed sensor, the excitor ring when rotated having the capacity to cause the sensor to produce a pulsating signal which reflects the angular velocity of the excitor ring.

2. A bearing according to claim 1 wherein the cup contains a bore which extends obliquely with respect to the axis and wherein the sensor is located in the bore.

3. A bearing according to claim 1 wherein the cup includes a flange having a back face that lies in a plane generally perpendicular to the axis.

4. A bearing according to claim 1 wherein the first thrust rib is formed integral with the cup, and the second thrust rib is initially a component separate from the cone.

5. A bearing according to claim 1 and further comprising a rib ring located against that end of the cone nearest the small diameter end of the cone raceway; and wherein the second thrust rib and excitor ring are on the rib ring.

6. A bearing according to claim 1 and further comprising a collar located beyond that end of the cone nearest the small diameter end of the cone raceway; and wherein the excitor ring is on the collar.

7. A bearing according to claim 1 wherein the cone forms part of an axle shaft that extends through the cup, and wherein the excitor ring encircles the axle.

8. A bearing according to claim 7 wherein the rib is on a rib ring that fits over the axle shaft.

9. A bearing according to claim 8 wherein the excitor ring is also on the rib ring.

10. In combination with an axle housing and an axle shaft which extends through the housing, a bearing assembly which enables the axle shaft to rotate within the housing about an axis, said bearing assembly comprising: an outer race mounted on the housing and having a tapered outer raceway presented inwardly toward the axis, the raceway having large and small ends; a first thrust rib fixed in position with respect to the outer race and projecting inwardly toward the axis past the large end of the raceway for the outer race; a tapered inner raceway carried by the axle shaft and presented outwardly away from the axis and toward the raceway of the outer race, with its large end located opposite the large end of the tapered raceway for the outer race and its small end located opposite the small end of the tapered raceway for the outer race; a second thrust rib fixed in position with respect to and projecting outwardly away from the axis past the small end of the inner raceway; tapered rollers located between and contacting the outer and inner raceways, the tapered rollers having large ends which are presented toward the first thrust rib and small ends which are presented toward the second thrust rib; a speed sensor mounted in the outer race and presented toward the axis beyond the small end of the raceway on the outer race; and an excitor ring carried by the axle shaft beyond the small ends of the rollers and having variations which cause the sensor to produce a pulsating signal when the variations move past the sensor, with the frequency of the signal reflecting the angular velocity of the excitor ring and axle shaft.

11. The combination according to claim 10 wherein outer race has a flange and is attached to the housing at the flange.

12. The combination according to claim 11 wherein the outer race contains a bore that extends obliquely with respect to the axis and opens into the interior of the race beyond the small end of the outer raceway and out of the race adjacent to the flange; and wherein the speed sensor is located in the bore.

13. The combination according to claim 10 wherein the second rib forms part of a rib ring that fits around the axle shaft and the excitor ring is on the rib ring.

14. The combination according to claim 10 and further comprising an inner race located around the axle shaft generally within the outer race, with the inner raceway being on the inner race, and a locking collar mounted firmly on the axle shaft beyond the end of the inner race and preventing the inner race from shifting axially on the axle shaft.

15. The combination according to claim 14 wherein the excitor ring is on the locking collar.

16. The combination according to claim 10 wherein the axis of the raceway on the outer race is slightly misaligned with respect to the axis of the axle housing.

17. In combination with a housing and an axle shaft that extends through the housing and has a shoulder; a bearing assembly that enables the axle shaft to rotate in the housing about an axis of rotation and to transfer thrust loads between the housing and axle shaft in both axial directions, said bearing assembly comprising: a cup fitted to the housing and having a tapered raceway presented inwardly toward the axis, whereby the raceway has large and small diameter ends; a first thrust rib mounted in a fixed position with respect to the cup and projecting inwardly toward the axis at the large diameter end of the tapered cup raceway; a cone mounted in a fixed position on the axle shaft and having a tapered raceway presented outwardly toward the raceway of the cup, whereby the cone raceway has large and small diameter ends, the large diameter end of the cone raceway being located near the shoulder on the axle shaft and generally within the large diameter end of the cup raceway and the small end of the cone raceway being generally within the small end of the cup raceway; a second thrust rib mounted in a fixed position with respect to the axle shaft and projecting outwardly away from the axis at the small end of the raceway for the cone; tapered rollers located between the cup and cone and along their tapered side faces contacting the raceways of the cup and cone, the large end faces of the tapered rollers being along the first thrust rib and the small end faces being along the second thrust rib; a speed sensor carried by the cup and presented inwardly toward the axis beyond the small ends of the rollers; and an excitor ring mounted in a fixed position with respect to the axle shaft beyond the small ends of the rollers and opposite the sensor, the excitor ring when it rotates having the capacity to excite the sensor such that the sensor produces a signal which reflects angular velocity.

18. The combination according to claim 17 wherein the first thrust rib is formed integral with the cup.

19. The combination according to claim 17 wherein a rib ring is located around the axle shaft beyond the cone raceway and the second thrust rib and the excitor ring are on the rib ring.

20. A bearing according to claim 17 wherein the cone is a component formed separately from the axle shaft and fits against the shoulder on the axle shaft.

21. The combination according to claim 20 and further comprising a locking collar fitted over the axle shaft beyond the end of the cone such that the cone is captured between the shoulder and the locking collar, and the excitor ring is on the locking ring.

22. A combination according to claim 17 wherein the cone is formed as an integral part of the axle shaft.

23. The combination according to claim 17 wherein the axis of the outer raceway is misaligned with respect to the axis of the axle housing.

* * * * *